United States Patent
Moreton et al.

(10) Patent No.: US 7,516,301 B1
(45) Date of Patent: Apr. 7, 2009

(54) MULTIPROCESSOR COMPUTING SYSTEMS WITH HETEROGENEOUS PROCESSORS

(75) Inventors: Henry Packard Moreton, Woodside, CA (US); Abraham B. de Waal, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 141 days.

(21) Appl. No.: 11/303,565

(22) Filed: Dec. 16, 2005

(51) Int. Cl.
*G06F 15/00* (2006.01)
*G06F 15/76* (2006.01)

(52) U.S. Cl. ..................................................... 712/28
(58) Field of Classification Search .................. 712/28, 712/15

See application file for complete search history.

(56) References Cited

U.S. PATENT DOCUMENTS

| | | | | |
|---|---|---|---|---|
| 4,783,738 A | * | 11/1988 | Li et al. | 712/21 |
| 4,992,933 A | * | 2/1991 | Taylor | 712/22 |
| 5,583,990 A | * | 12/1996 | Birrittella et al. | 712/29 |
| 5,680,597 A | * | 10/1997 | Kumar et al. | 712/226 |
| 5,706,514 A | * | 1/1998 | Bonola | 718/104 |
| 5,819,270 A | * | 10/1998 | Malone et al. | 707/7 |
| 5,892,964 A | * | 4/1999 | Horan et al. | 712/33 |
| 5,923,892 A | * | 7/1999 | Levy | 712/31 |
| 2004/0019765 A1 | * | 1/2004 | Klein, Jr. | 712/15 |

OTHER PUBLICATIONS

Weems et al.; Linguistic Support for Heterogeneous Parallel Processing: A Survey and an Approach; 1994; IEEE; HCW '94; pp. 81-88.*
Zhu et al.; A Distributed Rendering Environment for Massive Data on Computational Grids; 2003; IEEE; ICPPC '03.*

* cited by examiner

*Primary Examiner*—Eddie Chan
*Assistant Examiner*—Corey S Faherty
(74) *Attorney, Agent, or Firm*—Townsend and Townsend and Crew LLP (57) ABSTRACT

Heterogeneous processors can cooperate for distributed processing tasks in a multiprocessor computing system. Each processor is operable in a "compatible" mode, in which all processors within a family accept the same baseline command set and produce identical results upon executing any command in the baseline command set. The processors also have a "native" mode of operation in which the command set and/or results may differ in at least some respects from the baseline command set and results. Heterogeneous processors with a compatible mode defined by reference to the same baseline can be used cooperatively for distributed processing by configuring each processor to operate in the compatible mode.

16 Claims, 3 Drawing Sheets

MULTIPROCESSOR COMPUTING SYSTEMS WITH HETEROGENEOUS PROCESSORS

BACKGROUND OF THE INVENTION

The present invention relates in general to computing systems, and in particular to multiprocessor computing systems in which heterogeneous processors cooperate to process data.

Graphics processing subsystems are designed to render realistic animated images in real time, e.g., at 30 or more frames per second. These subsystems are most often implemented on expansion cards that can be inserted into appropriately configured slots on a motherboard of a computer system and generally include a dedicated graphics processing unit (GPU) and dedicated graphics memory. The typical GPU is a highly complex integrated circuit device optimized to perform graphics computations (e.g., matrix transformations, scan-conversion and/or other rasterization techniques, texture blending, etc.), write the resulting pixels to the graphics memory, and deliver the pixels in real time to a display device. The GPU operates in response to commands received from a driver program executing on a central processing unit (CPU) of the system.

As is known in the art, it can be useful to produce a "family" of GPU designs. Within a family, each GPU is designed on a common underlying architecture, but each GPU design in the family has distinct features. For instance, different designs in the same family may provide different degrees of parallelism, allowing end users or other system builders to choose a combination of performance versus power consumption and/or chip area that best suits a particular intended use.

Different GPU designs in the family usually include some differences that affect the GPU's processing behavior in terms of command sets and/or results. For example, a bug present in an earlier design in the family might be corrected in a later design. Various optimizations can also be introduced, e.g., in the order of operations in a compound operation, that can affect the results of floating-point computations. The internal precision used in some or all of the functional units might also be changed (e.g., to reduce rounding errors or to save chip area). The later designs might also include support for additional commands beyond the command set supported by earlier designs. Any of these or other design differences can result in different GPUs in the same family producing different results, even if the same command sequence is delivered to each GPU. Such differences in results are usually (though not necessarily) minor, appearing in the least significant bits of floating-point numbers and having little or no effect on the final rendered image.

Recently, there has been interest in multi-chip graphics processing subsystems that include two or more GPUs operating in parallel. Such systems typically support a "distributed rendering" mode, in which rendering tasks are distributed among the GPUs. Tasks may be distributed in various ways, such as by assigning different GPUs to render different portions of an image or different images in a specific sequence. For example, in a "split frame rendering" mode, each GPU generates pixel data for a different portion of the displayable image, such as a number of lines of a raster-based display. The image is displayed by scanning out the pixel data from each GPU's display buffer and selecting a pixel generated by one or another of the GPUs depending on screen position. As another example, in an "alternate frame rendering" mode, each GPU generates pixel data for a different image in a temporal sequence (e.g., different frames of an animated image such as a 3D video game).

Rendering work can also be divided among GPUs in other ways. For instance, many video game programs implement a "Z-first" rendering approach in which each primitive is processed twice. In the first pass, a depth buffer (also referred to as a Z buffer) is populated with the depth coordinate (computed in viewing space) for the closest visible primitive at each fragment location. In the second pass, the depth coordinate for each primitive is recomputed, and fragment shading algorithms are executed for the primitive only if its depth coordinate matches the stored depth coordinate at a given fragment. In a multiprocessor graphics system, one GPU can perform the first pass, then deliver the populated Z buffer to a second GPU, which performs the Z-match test and fragment shading.

To the extent that the GPUs in a distributed rendering system do not produce identical results for the same operations, visible artifacts may occur in the rendered images. For instance, in split-frame rendering, if the final pixel colors are not identical, a seam may be visible along the line where one GPU's portion of the image ends and another GPU's begins. In Z-first rendering, if the depth coordinates calculated by the two GPUs are not identical, primitives that should be used for shading in the second pass might fail the Z-match test, or a primitive that should not be used might pass the Z-match test and be used. Either way, visible artifacts (e.g., incorrectly shaded pixels in small or large regions of the image) can result.

The requirement for identical results limits the ability to use heterogeneous GPUs (i.e., GPUs that have at least some design differences) for distributed rendering. Each heterogeneous combination needs to be individually tested to ensure that results from both GPUs in all relevant cases are identical down to the last bit. This testing can be prohibitive, and consequently, manufacturers generally choose to restrict the use of heterogeneous GPUs for distributed rendering. This restriction, in turn, limits the ability of users to upgrade and reconfigure existing single-chip systems for distributed rendering or to develop a distributed rendering solution optimized for a particular task.

It would therefore be desirable to provide a family of processors within which heterogeneous processors can be used cooperatively for distributed processing tasks, such as distributed rendering, while guaranteeing compatible results.

BRIEF SUMMARY OF THE INVENTION

Embodiments of the present invention provide multiprocessor computing systems in which heterogeneous processors can be used together for a distributed processing task; for instance, multiple heterogeneous graphics processors can be used for distributed rendering. Each processor is operable in a "compatible" mode, in which all processors within a family accept the same command set (referred to herein as a "baseline" command set) and produce identical results upon executing any command in the baseline command set. The processors advantageously also have a "native" mode of operation in which the command set and/or results may differ in at least some respects from the baseline command set and results. Heterogeneous processors with a compatible mode defined by reference to the same baseline can be used together for distributed processing by configuring each processor to operate in the compatible mode. Configuration of the processors to operate in compatible or native mode can be managed by a driver program or other suitable agent.

According to one aspect of the present invention, a computing system includes a first processor and a second processor communicably coupled to the first processor. The second processor has a design that differs in at least one respect from a design of the first processor. The first processor and the second processor are each operable in a compatible mode in which the first and second processors accept a same baseline command set and produce identical results upon executing any command in the baseline command set. The subsystem is configurable such that the first processor and the second processor cooperate to perform a distributed processing task.

In some embodiments, the second processor is also operable in a native mode, with a result produced by the second processor upon executing at least one command being dependent on whether the second processor executes the at least one command in the compatible mode or in the native mode. The first processor may also be operable in a native mode, with a result produced by the first processor upon executing at least one command being dependent on whether the first processor executes the at least one command in the compatible mode or in the native mode. The result produced by the first processor in the native mode may be different from the result produced by the second processor in the native mode; in other embodiments, operation of the first processor in the native mode produces results identical to operation of the first processor in the compatible mode.

Compatible and native modes may be implemented in various ways. In some embodiments, the second processor includes a pipemode register configured to store a value indicating whether the second processor is to operate in the compatible mode or the native mode and a functional unit configured to execute an operation in response to a command. Execution of the operation by the functional unit is advantageously controlled at least in part by the value stored in the pipemode register.

In some embodiments, the computing system also includes a driver module adapted to define a configuration for the computing system. The driver module advantageously configures the first processor and the second processor to operate in the compatible mode in the event that the system is configured such that the first processor and the second processor share data and to operate in a native mode in the event that the system is configured such that the first processor and the second processor do not share data.

The designs of the first and second processors may differ in various respects. For instance, a bug fix might be present in the design of the second processor but not in the design of the first processor; such a bug fix would be disabled when the second processor is in the compatible mode. Similarly, an optimization in an execution sequence associated with at least one command in the baseline command set might be available in the second processor but not the first processor; such an optimization would not be used when the second processor is in the compatible mode.

The computing system may include any number (two or more) of processors. In some embodiments, the computing system includes a third processor communicably coupled to at least one of the first and second processors, the third processor having a design that differs in at least one respect from a design of the first processor. The third processor is operable in a compatible mode; in this mode, the third processor accepts the same baseline command set as the first and second processors and produces identical results to the first and second processor upon executing any command in the baseline command set. The system is configurable such that the first, second, and third processors share result data. The design of the third processor might be different from or identical to the design of the second processor.

Embodiments of the present invention can be employed to enable distributed processing in any multiprocessor system.

In some embodiments, the first and second processors are graphics processors that may be used for distributed rendering tasks or for other distributed processing tasks.

According to another aspect of the present invention, a method of configuring a computing system that has multiple processors includes determining whether a first one and a second one of the processors are heterogeneous (i.e., whether they have designs that differ from each other in at least one respect). In the event that the first and second processors are heterogeneous, each of the first and second processors is configured to operate in a compatible mode. When operating in the compatible mode, the first and second processors accept an identical baseline command set and produce identical results upon executing any command in the baseline command set. In the event that the first and second processors are not heterogeneous, each of the first and second processors is configured to operate in a native mode. A result produced by the second processor upon executing at least one command is dependent on whether the second processor executes the at least one command in the compatible mode or in the native mode. In some embodiments, a result produced by the first processor upon executing the at least one command in the native mode is different from the result produced by the second processor when executing the at least one command in the native mode.

According to still another aspect of the present invention, a method of configuring a computing system that has multiple processors includes determining whether a first one and a second one of the processors are heterogeneous. It is also determined whether the first and second processors are to be executing a distributed processing task. In the event that the first and second processors are heterogeneous and are to be executing a distributed processing task, each of the first and second processors is configured to operate in a compatible mode. When operating in the compatible mode, the first and second processors accept an identical baseline command set and produce identical results upon executing any command in the baseline command set.

In the event that the first and second processors are not to be executing a distributed processing task, each of the first and second processors can be configured to operate in a native mode, with a result produced by the second processor upon executing at least one command being dependent on whether the second processor executes the at least one command in the compatible mode or in the native mode.

In some embodiments, in the event that the first and second processors are not heterogeneous, each of the first and second processors is configured to operate in a native mode regardless of whether they are to be executing a distributed processing task. Where processors that are not heterogeneous are executing a distributed processing task, native mode can advantageously be used even if a result produced by the first or second processor upon executing at least one command is dependent on whether the processor executes the at least one command in the compatible mode or in the native mode. Since the processors are not heterogeneous, respective results produced by the first processor and the second processor upon executing any command in the native mode will (in the absence of defects) be identical to each other.

The following detailed description together with the accompanying drawings will provide a better understanding of the nature and advantages of the present invention.

DETAILED DESCRIPTION OF THE INVENTION

Embodiments of the present invention provide multiprocessor computing systems in which heterogeneous processors can be used together to execute a distributed processing task. Each processor is operable in a "compatible" mode, in which all processors within a family accept the same command set (referred to herein as a "baseline" command set) and produce identical results upon executing any command in the baseline command set. The processors advantageously also have a "native" mode of operation in which the command set and/or results may differ in at least some respects from the baseline command set and results. Heterogeneous processors with a compatible mode defined by reference to the same baseline can be used together for distributed processing by configuring each processor to operate in the compatible mode. Configuration of the processors to operate in compatible or native mode can be managed by a driver program or other suitable agent.

As used herein, a "distributed processing task" refers to any task that entails cooperation and/or data sharing between two or more processors. While distributed rendering, in which different processors cooperate to generate image data, is used herein as an example, persons having ordinary skill in the art with access to the present teachings will recognize that the present invention also applies to any distributed processing task performed by two or more processors. For instance, in other distributed processing tasks, different processors may process different portions of a shared input data set and/or generate different portions of an output data set, or one processor may produce a result that is subsequently consumed by one or more other processors.

Figure 1:
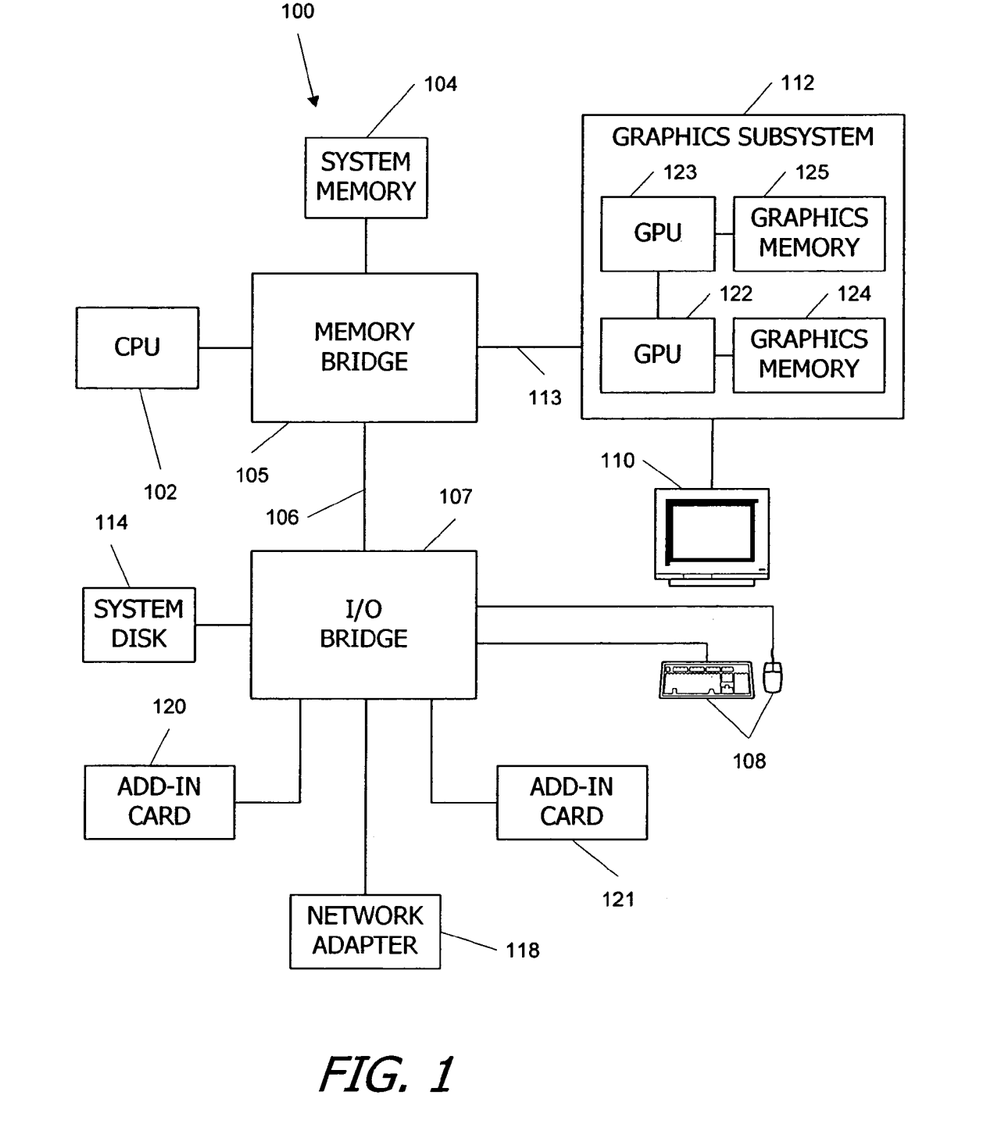
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105 is connected via a bus path 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus 113. A system disk 114 is also connected to I/O bridge 107. I/O bridge 107 may be connected to other components such as a network adapter 118 and various add-in cards 120, 121, as well as USB or other port connections, CD drives, DVD drives, and the like (not explicitly shown). Bus connections among the various components may be implemented using bus protocols such as PCI (Peripheral Component Interconnect), PCI Express (PCI-E), AGP (Accelerated Graphics Port), HyperTransport, or any other bus protocol(s), and connections between different devices may use different protocols as is known in the art.

Graphics processing subsystem 112 includes at least two graphics processing units (GPUs) 122, 123. GPU 122 has an associated graphics memory 124, and GPU 123 has an associated graphics memory 125. GPUs 122, 123 and graphics memories 124, 125 may be implemented, e.g., using one or more integrated circuit devices such as programmable processors, application specific integrated circuits (ASICs), and memory devices. In some embodiments, GPUs 122, 123 and graphics memories 124, 125 are implemented in one or more expansion cards or other adapters that can be inserted into and removed from expansion slots (e.g., PCI-E slots) in system 100. Additional GPUs (not shown in FIG. 1) may also be included.

Each of GPUs 122, 123 may be configured to perform various tasks related to generating pixel data (also referred to herein as "pixels") from graphics data supplied by CPU 102 and/or system memory 104 via memory bridge 105 and bus 113, interacting with a respective graphics memories 124, 125 to store and update pixel data, and the like. For example, GPUs 122, 123 may generate pixel data from 2-D or 3-D scene data provided by various programs executing on CPU 102. GPUs 122, 123 may also store pixel data received via memory bridge 105 to respective graphics memories 124, 125 with or without further processing. Each of GPUs 122, 123 may also includes a scanout module (also referred to herein as a display pipeline) that can be configured to deliver pixel data from respective graphics memories 124, 125 to an output port of the GPU 122, 123. The output port might be connected to a monitor or to another GPU.

Where GPUs 122, 123 are communicably coupled to each other, distributed rendering in various forms can be supported. For example, in split-frame rendering, GPU 122 can render a top portion of an image while GPU 123 renders a bottom portion of the same image. In alternate frame rendering, GPU 122 can render a first frame in an image sequence while GPU 123 renders a second frame, and so on. In Z-first distributed rendering, GPU 122 can populate a Z buffer and deliver the Z buffer data to GPU 123, which uses the Z buffer data provided by GPU 122 to determine which primitives to process in a fragment shader. It will be appreciated that a particular form of distributed rendering is not critical to the present invention.

In some embodiments, GPUs 122 and 123 may be also operable in an "independent rendering" mode in which GPU 122 and 123 render images for different display devices; the images rendered by GPUs 122 and 123 in independent rendering mode might or might not be related to each other. It is to be understood that GPUs 122 and 123 may be configurable to operate in any of the above or other modes.

In accordance with an embodiment of the present invention, GPUs 122 and 123 may be "heterogeneous," meaning that their designs may be different in at least some respects. As described below, GPUs 122 and 123 are advantageously operable in a "compatible mode," in which they process the same commands and produce identical results regardless of any design differences that may exist. The compatible mode is used to support distributed rendering.

CPU 102 operates as the master processor of system 100, controlling and coordinating operations of other system components. In particular, CPU 102 issues commands that control the operation of GPUs 122 and 123. The commands may include conventional rendering commands for generating images as well as general-purpose computation commands that enable applications executing on CPU 102 to leverage the computational power of GPUs 122 and 123 for computing that may be unrelated to image generation. Within GPUs 122, 123 the commands control operation of various functional units that execute data-processing tasks (adding, multiplying, texture filtering, etc.).

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPUs 122 and 123 to the rest of system 100 may also be varied. In some embodiments, graphics subsystem 112 is implemented using one or more expansion cards that can be inserted into expansion slots of system 100, with one or more GPUs on each card. In other embodiments, one or more of the GPUs is integrated on a single chip with a bus bridge, such as memory bridge 105 or I/O bridge 107.

Each GPU may be provided with any amount of local graphics memory, including no local memory, and may use local memory and system memory in any combination. For instance, in a unified memory architecture (UMA) embodiment, no dedicated graphics memory device is provided, and some or all of the GPUs may use system memory exclusively or almost exclusively. In UMA embodiments, a GPU may be integrated into a bus bridge chip or provided as a discrete chip with a high-speed bus (e.g., PCI-E) connecting the GPU to the bridge chip and system memory.

In addition, graphics subsystems embodying aspects of the present invention may be incorporated into a variety of devices, including general purpose computer systems, video game consoles and other special purpose computer systems, DVD players, handheld devices such as mobile phones or personal digital assistants, and so on.

In accordance with an embodiment of the present invention, heterogeneous GPUs can be used to implement system 100. Each GPU in a family of GPUs is designed to be operable in a "compatible" mode and a "native" mode. When operating in the compatible mode, each GPU in the family accepts the same set of commands (referred to herein as a "baseline" command set), and all GPUs in the family produce identical results (referred to herein as the "baseline" results) when executing any of the baseline commands in the compatible mode for any combination of operands. (As used herein, results are "identical" if they express exactly the same value in the same format.)

The definition of the baseline command set and baseline results is a matter of design choice. For instance, the first GPU design in the family can be used to define a baseline, with later GPUs being designed such that their operation in compatible mode conforms to this baseline. (As long as existing GPUs cannot readily be reconfigured to match their behavior to that of a later-developed GPU, this is the most practical approach.)

In the native mode, a GPU may depart from the baseline behavior. The GPU may accept commands that are not included in the baseline set and/or generate results that are not identical to the baseline results even while executing baseline commands. For some GPUs, such as the baseline GPU in a family, operation in the native mode may be identical in all respects to operation in the compatible mode.

When heterogeneous GPUs that belong to the family are used for distributed rendering, each GPU is configured to operate in the compatible mode. Since all GPUs in the family are known to accept the same baseline command set and produce the same baseline results when operating in this mode, any combination of GPUs in the family can be used together in a distributed rendering system.

When a GPU is used for independent rendering (meaning that the GPU is not sharing data with another GPU), it can be configured to operate in its native mode, even if other GPUs are also present. In this mode, any bug fixes, optimizations, and the like can be exploited for optimal performance of the GPU.

In one embodiment, each GPU has a control register that stores a "pipemode" value indicating whether the GPU is currently in the native mode or the compatible mode. The pipemode register delivers this value to control circuits that control various functional blocks within the GPU.

Figure 2:
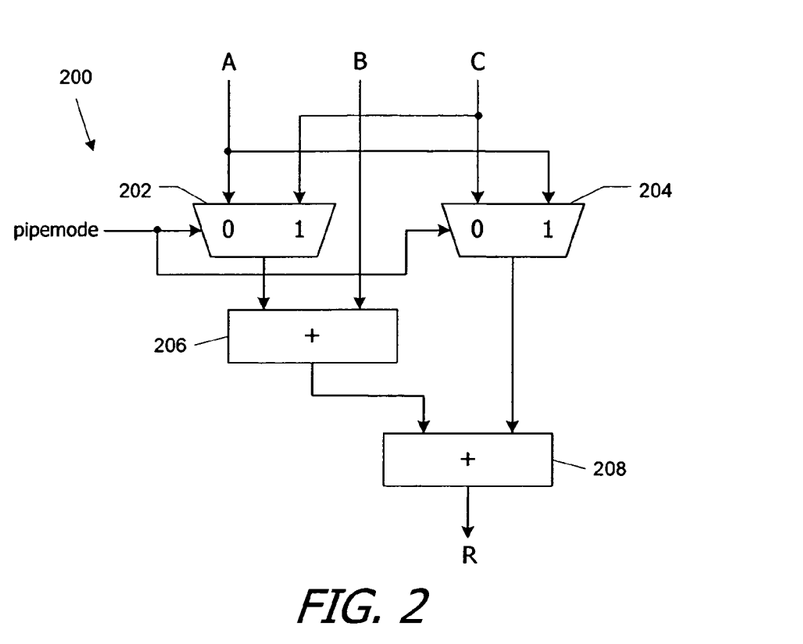
FIG. 2 is a block diagram illustrating compatible and native modes in a functional block in a graphics processor according to an embodiment of the present invention.

By way of example, FIG. 2 is a simplified block diagram illustrating the use of the pipemode value to control operation of a hypothetical functional block 200 in a GPU 122 according to an embodiment of the present invention. In this example, the baseline command set includes a command that results in the addition of three floating-point operands A, B, and C. In a baseline design, the addition is performed as (A+B)+C and produces a result $R_{base}$, while an alternative approach is to perform (C+B)+A to produce a result $R_{alt}$. Those skilled in the art will appreciate that for at least some combinations of operands A, B, and C, the results $R_{base}$ and $R_{alt}$ may be non-identical since floating-point addition is generally not associative. It is supposed herein that $R_{alt}$ represents an optimization; for instance, it may be that $R_{alt}$ is less prone to overflow or underflow for likely values of operands A, B and C.

Functional block 200 of FIG. 2 computes $R_{base}$ when operating in the compatible mode and $R_{alt}$ when operating in the native mode. In this embodiment, the pipemode value is a single bit that can be set to 0 (logic low) to select the compatible mode and 1 (logic high) to select the native mode. Operands A and C are received by multiplexers 202 and 204, which may be of generally conventional design. Multiplexers 202 and 204 are both controlled by the pipemode value.

In the compatible mode, multiplexer 202 forwards operand A to a first adder 206, where operands A and B are added, while multiplexer 204 forwards operand C to a second adder 208, where it is added to the sum (A+B) computed by first adder 206. In this mode, R=(A+B)+C, conforming to the baseline behavior defined above.

In the native mode, multiplexer 202 forwards operand C to a first adder 206, where operands C and B are added, while multiplexer 204 forwards operand A to a second adder 208, where it is added to the sum (C+B) computed by first adder 206. In this mode, R=(C+B)+A, conforming to the alternative behavior described above.

It will be appreciated that functional block 200 is illustrative and that a similar principle can be applied to support compatible and native modes with different behaviors in any functional block of a GPU. In some embodiments, the native mode might implement an optimization, bug fix, or the like that is inconsistent with the baseline behavior; conditional bypass or selection logic controlled by a pipemode value can be used to "turn off" such optimizations, bug fixes, or the like when the processor is operated in compatible mode.

It should be noted that a GPU's performance in compatible mode need not match its performance in native mode. For instance, to the extent that performance optimizations are used only in native mode, the GPU may perform faster in native mode.

Figure 3A:
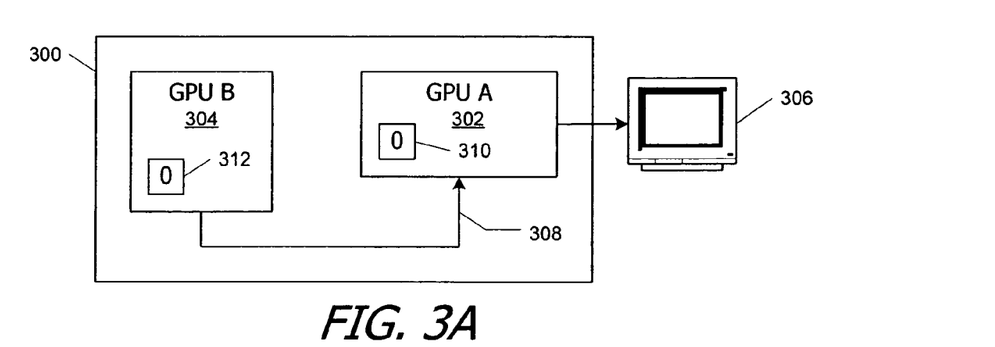
FIGS. 3A and 3B are a block diagrams of a graphics subsystem according to an embodiment of the present invention, with FIG. 3A showing the subsystem configured for distributed rendering and FIG. 3B showing the subsystem reconfigured for independent rendering.

In an embodiment of the present invention, heterogeneous GPUs in a multichip system can be operated in native mode or compatible mode. For example, FIG. 3A is a block diagram of a graphics subsystem 300 configured for distributed rendering according to an embodiment of the present invention. Graphics subsystem 300 includes a first GPU 302 and a second GPU 304. GPUs 302 and 304 are of heterogeneous design but belong to the same family. GPU 302 is connected to a display device 306. A link 308 between GPUs 302 and 304 is active, allowing GPU 304 to transfer pixel data and/or other information to GPU 302 to support distributed rendering. Link 308 may be implemented in any manner desired, and a detailed description is omitted as not being critical to the present invention.

GPU 302 has a pipemode register 310, and GPU 304 has a pipemode register 312. To support distributed rendering, pipemode registers 312 each store the logic low (0) value, selecting the compatible mode. In this configuration, GPU 302 and GPU 304 process the same baseline command set and produce identical results, allowing reliable distributed rendering operation regardless of any design differences.

Figure 3B:
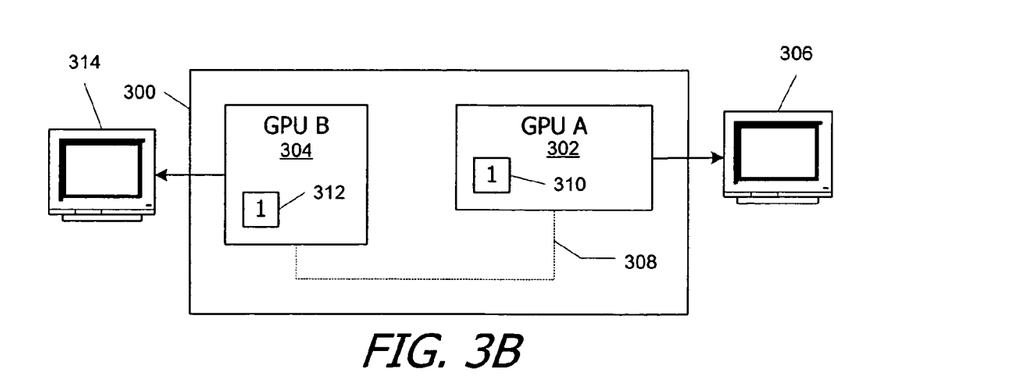

FIG. 3B is a block diagram of graphics subsystem 300 reconfigured for independent rendering according to an embodiment of the present invention. A second display device 314 is connected to GPU 304. In this configuration, GPU 302 renders images for display by device 306 while GPU 304 renders images for display by device 314. GPUs 302 and 304 do not share data, and link 308 is idle (indicated by the dotted line).

Where GPUs 302 and 304 are not sharing data, it is desirable to allow each GPU to make use of any optimizations, bug fixes or the like that may have been implemented therein. Accordingly, pipemode registers 310 and 312 each store the logic high (1) value, selecting the native mode. In this configuration, GPU 302 and GPU 304 may process different command sets and/or produce different results when executing the same command.

It will be appreciated that graphics subsystem 300 is illustrative and that variations and modifications are possible. Any two or more GPUs from the same family may be included, regardless of whether they happen to be of the same or different designs. For instance, one GPU might be integrated into a bridge chip (e.g., memory bridge 105 or I/O bridge 107 of FIG. 1) while another GPU is implemented in an expansion card. The GPUs need not have the same processing capacity. For instance, in FIGS. 3A and 3B, GPU 304 might be a bridge-integrated GPU that is designed for low cost while GPU 302 is a high-performance (and high-cost) chip mounted on an expansion card.

The value to be stored in pipemode registers 310, 312 may be provided to GPUs 302, 304 in various ways. In some embodiments, a graphics driver program executing on CPU 102 (FIG. 1) determines, based on information about what GPUs are present and how the graphics system is to be used, whether each GPU is to operate in compatible or native mode and delivers the corresponding value to be stored in the pipemode register.

Figure 4:
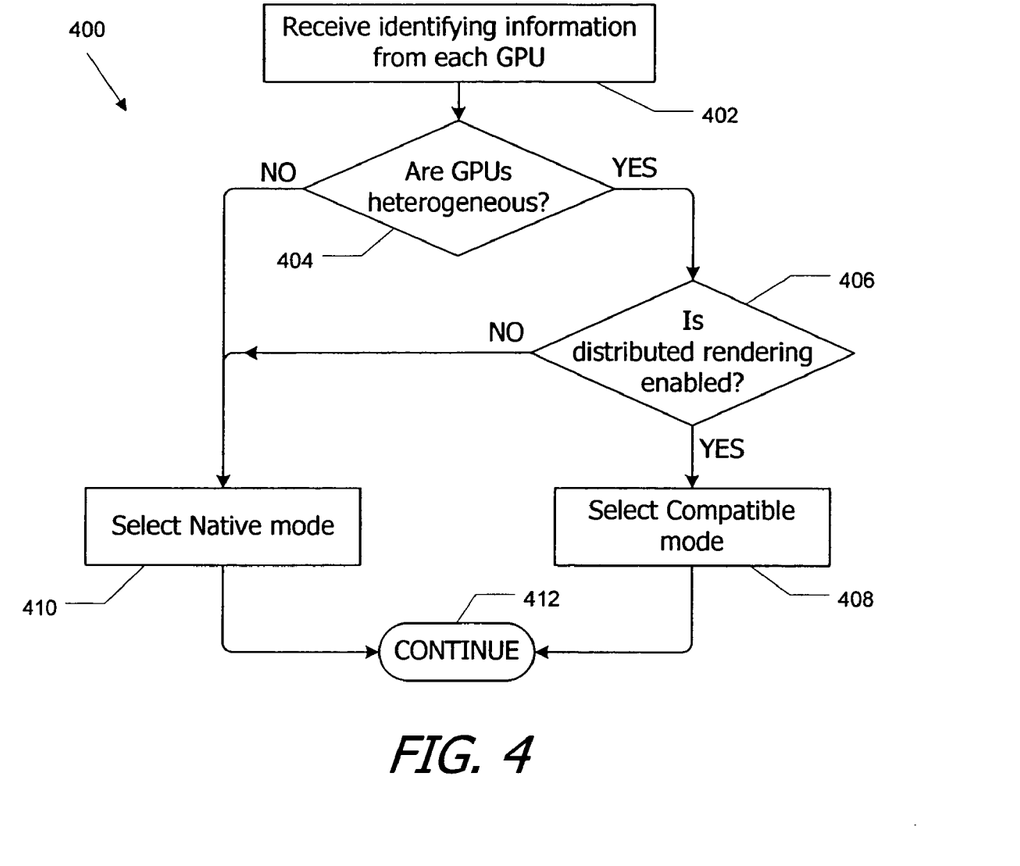
FIG. 4 is a flow diagram of a process for selecting between compatible and native modes according to an embodiment of the present invention.

FIG. 4 is a flow diagram of a process 400 for selecting between compatible and native modes according to an embodiment of the present invention. In this embodiment, compatible mode is selected when heterogeneous GPUs are to be used together for distributed rendering. Native mode is selected when homogeneous GPUs (i.e., GPUs having identical design) are to be used together for distributed rendering or when a GPU is to be used for independent rendering.

More specifically, at step 402, the driver receives identifying information from each GPU in the system. This information may be provided to the driver, e.g., at system startup, via conventional techniques. The information provided is advantageously sufficient to allow the driver to determine whether the GPUs are homogeneous or heterogeneous (step 404).

If the GPUs are heterogeneous, then at step 406, the driver determines whether the GPUs are to be used together for distributed rendering (or for other forms of data sharing). If so, then the GPUs need to produce identical results. Accordingly, at step 408, the driver selects the compatible mode. If the heterogeneous GPUs are not being used together for distributed rendering, then at step 410, the driver selects the native mode. In one embodiment, the driver selects a mode by writing a corresponding value to the pipemode register of each GPU; other techniques may be substituted.

Referring again to step 404, if the GPUs are homogeneous, then they are expected to process the same command set and produce identical results in the native mode as well as in the compatible mode. The native mode command set and results might or might not be identical to the baseline command set and results, but for purposes of distributed rendering, conformity to a particular baseline is not required as long as the results from different GPUs are identical to each other. Thus, homogeneous GPUs in their native mode can be used together for distributed rendering.

Accordingly, if at step 404 the GPUs are determined to be homogeneous, then process 400 proceeds to select the native mode (step 410) regardless of whether the GPUs are to be used for distributed rendering. At step 412, regardless of the mode selected, the driver continues with its operations.

It will be appreciated that the configuration process described herein is illustrative and that variations and modifications are possible. Steps described as sequential may be executed in parallel, order of steps may be varied, and steps may be modified or combined. The mode can be selected at system startup and/or at any other time when the configuration of the system changes. Where there are more than two GPUs in the system, process 400 can be applied across all the GPUs or to any subset of the GPUs. In some embodiments, the compatible mode might be selected upon determining that the GPUs are heterogeneous without making a separate determination as to whether they will be sharing data.

It should be noted that the selection of compatible or native mode may affect subsequent operation of the graphics driver. For example, when the GPUs are operating in compatible mode, the driver advantageously delivers only commands in the baseline command set. When a GPU is operating in native mode, the driver may exploit command set extensions and optimizations that are not included in the baseline command set but are recognized by the particular GPU to which they are delivered.

While the invention has been described with respect to specific embodiments, one skilled in the art will recognize that numerous modifications are possible. For instance, some GPUs might support multiple different compatible modes, each such mode being defined by reference to a different baseline. The driver (or other system configuration agent) would select among the possible compatible modes depending on which GPUs are being (or might be) used cooperatively in a particular system.

Further, while the foregoing description refers specifically to graphics processing subsystems used for distributed rendering, it should be understood that the present invention may also be applied to other types of processors that can cooperate to execute distributed processing tasks. For instance, as noted above, some graphics processors can be used for general-purpose computations unrelated to image generation or display; in some embodiments, the present invention supports distributed general-purpose processing across heterogeneous graphics processors. In other embodiments, processors other than graphics processors (including, e.g., general-purpose processors) may be operable in compatible and native modes as described above; when two or more such processors cooperate in distributed processing, they may also be operated in the compatible mode if some or all of the processors are heterogeneous members of a family.

A multiprocessor computing system can include any number of processors. Where more than two processors are present, two more of the processors might be homogeneous with each other but not with a third processor. As long as every processor has a compatible mode defined by reference to the same baseline, any number of processors can reliably cooperate to execute distributed processing tasks. Accordingly, a "family" of processors within the scope of the present invention should be understood as including any set of heterogeneous processors that all process the same baseline command set and produce identical results when operated in compatible mode. The designs of heterogeneous processors within a family may be different to any degree desired. Those skilled in the art will appreciate that it might be deemed not worthwhile to support a common compatible mode across radically different processor designs; however, there is no inherent limitation on the degree of difference that may exist within a family.

Thus, although the invention has been described with respect to specific embodiments, it will be appreciated that the invention is intended to cover all modifications and equivalents within the scope of the following claims.

What is claimed is:

1. A computing system comprising:
   a first processor configurable to operate in any one of a plurality of modes including a native mode and a compatible mode, the first processor including a pipemode register configured to store a value indicating which one of the modes is currently selected; and
   a second processor communicably coupled to the first processor and configurable to operate in any one of a plurality of modes including a native mode and a compatible mode, the second processor including a pipemode register configured to store a value indicating which one of the modes is currently selected, the second processor having a design that differs in at least one respect from a design of the first processor in that a bug fix is present in the design of the second processor but not in the design of the first processor, the bug fix being disabled when the processor is configured to operate in the compatible mode,
   wherein the computing system is configurable such that the first processor and the second processor cooperate to perform a distributed processing task and wherein:
      when operated in the compatible mode, each of the first and second processors accepts a same baseline command set and produces identical results upon executing any command in the baseline command set, wherein the baseline command set includes a first command that, when executed by either the first or second processor in the compatible mode, produces a first result;
      when operated in the native mode, the first processor, upon executing the first command, produces a second result that is different from the first result; and
      when operated in the native mode, the second processor, upon executing the first command, produces a third result that is different from both the first result and the second result.

2. The computing system of claim 1 further comprising:
   a driver module adapted to define a configuration for the computing system,
   wherein the driver module configures the first processor and the second processor to operate in the compatible mode in the event that the computing system is configured such that the first processor and the second processor share data.

3. The computing system of claim 2 wherein the driver module configures the first processor and the second processor to operate in a native mode in the event that the computing system is configured such that the first processor and the second processor do not share data.

4. The computing system of claim 1 further comprising:
   a third processor communicably coupled to at least one of the first and second processors, the third processor having a design that differs in at least one respect from a design of the first processor,
   the third processor being operable in a compatible mode in which the third processor accepts the same baseline command set as the first and second processors and produces identical results to the first and second processor upon executing any command in the baseline command set,
   wherein the system is configurable such that the first, second, and third processors share result data.

5. The computing system of claim 4 wherein the design of the third processor differs in at least one respect from the design of the second processor.

6. The computing system of claim 1 wherein the first and second processors are graphics processors.

7. The computing system of claim 6 wherein the distributed processing task is a distributed rendering task.

8. A method of configuring a computing system having a plurality of processors, the method comprising:
   determining whether a first one and a second one of the processors are heterogeneous, the first and second one of the processors being communicably coupled and being configurable to operate in any one of a plurality of modes including a native mode and a compatible mode;
   in the event that the first and second processors are heterogeneous, configuring each of the first and second processors to operate in a compatible mode, the second processor including a pipemode register configured to store a value indicating which one of the modes is currently selected, the second processor having a design that differs in at least one respect from a design of the first processor;
   wherein when operated in the compatible mode, each of the first and second processors accepts a same baseline command set and produces identical results upon executing any command in the baseline command set, wherein the baseline command set includes a first command that, when executed by either the first or second processor in the compatible mode, produces a first result;
   wherein when operated in the native mode, the first processor, upon executing the first command, produces a second result that is different from the first result; and
   where when operated in the native mode, the second processor, upon executing the first command, produces a third result that is different from both the first result and the second result,
   in the event that the first and second processors are not heterogeneous, configuring each of the first and second processors to operate in a native mode regardless of whether they are to be executing a distributed processing task, wherein the driver program configures each of the first and second processors to operate in the native mode,
   wherein a result produced by the second processor upon executing at least one command is dependent on whether the second processor executes the at least one command in the compatible mode or in the native mode, and wherein respective results produced by the first processor and the second processor upon executing any command in the native mode are identical to each other.

9. The computing system of claim 8 wherein in the event that the first and second processors are heterogeneous the designs of the first and second processors differ in that a bug fix is present in the design of the second processor but not in the design of the first processor,
wherein the bug fix is disabled when the second processor is in the compatible mode.

10. The computing system of claim 8 wherein in the event that the first and second processors are heterogeneous the designs of the first and second processors differ in that an optimization in an execution sequence associated with at least one command in the baseline command set is available in the second processor but not in the first processor,
wherein the optimization is not used when the second processor is in the compatible mode.

11. The method of claim 8 wherein the first and second processors are graphics processors.

12. The method of claim 11 wherein the at least one command comprises a distributed rendering task.

13. A method of configuring a computing system using a driver program having a plurality of processors, the method comprising:
receiving, at the driver program, identifying information from each processor in the computing system;
determining, using the driver program, whether a first one and a second one of the processors are heterogeneous based upon the identifying information from each processor, the first and second one of the processors being communicably coupled and being configurable to operate in any one of a plurality of modes including a native mode and a compatible mode;
determining, using the driver program, whether the first and second processors are to be executing a distributed processing task; and
in the event that the first and second processors are heterogeneous and are to be executing a distributed processing task, configuring each of the first and second processors to operate in the compatible mode, the second processor including a pipemode register configured to store a value indicating which one of the modes is currently selected, the second processor having a design that differs in at least one respect from a design of the first processor,
wherein when operated in the compatible mode, each of the first and second processors accepts a same baseline command set and produces identical results upon executing any command in the baseline command set, wherein the baseline command set includes a first command that, when executed by either the first or second processor in the compatible mode, produces a first result;
wherein when operated in the native mode, the first processor, upon executing the first command, produces a second result that is different from the first result; and
wherein when operated in the native mode, the second processor, upon executing the first command, produces a third result that is different from both the first result and the second result,
in the event that the first and second processors are not heterogeneous, configuring each of the first and second processors to operate in a native mode regardless of whether they are to be executing a distributed processing task, wherein the driver program configures each of the first and second processors to operate in the native mode,
wherein a result produced by the second processor upon executing at least one command is dependent on whether the second processor executes the at least one command in the compatible mode or in the native mode, and
wherein respective results produced by the first processor and the second processor upon executing any command in the native mode are identical to each other.

14. The method of claim 13 further comprising:
in the event that the first and second processors are not to be executing a distributed processing task, configuring each of the first and second processors to operate in a native mode, wherein the driver program configures each of the first and second processors to operate in the native mode,
wherein a result produced by the second processor upon executing at least one command is dependent on whether the second processor executes the at least one command in the compatible mode or in the native mode.

15. The method of claim 13 further comprising:
in the event that the first and second processors are not heterogeneous, configuring each of the first and second processors to operate in a native mode regardless of whether they are to be executing a distributed processing task, wherein the driver program configures each of the first and second processors to operate in the native mode,
wherein a result produced by the second processor upon executing at least one command is dependent on whether the second processor executes the at least one command in the compatible mode or in the native mode, and
wherein respective results produced by the first processor and the second processor upon executing any command in the native mode are identical to each other.

16. A computing system comprising:
a first processor configurable to operate in any one of a plurality of modes including a native mode and a compatible mode, the first processor including a pipemode register configured to store a value indicating which one of the modes is currently selected; and
a second processor communicably coupled to the first processor and configurable to operate in any one of a plurality of modes including a native mode and a compatible mode, the second processor including a pipemode register configured to store a value indicating which one of the modes is currently selected, the second processor having a design that differs in at least one respect from a design of the first processor in that an optimization in an execution sequence associated with at least one command in the baseline command set is available in the second processor but not in the first processor, wherein the optimization is not used when the second processor is in the compatible mode,
wherein the computing system is configurable such that the first processor and the second processor cooperate to perform a distributed processing task and wherein:
when operated in the compatible mode, each of the first and second processors accepts a same baseline command set and produces identical results upon executing any command in the baseline command set, wherein the baseline command set includes a first command that, when executed by either the first or second processor in the compatible mode, produces a first result;
when operated in the native mode, the first processor, upon executing the first command, produces a second result that is different from the first result; and
when operated in the native mode, the second processor, upon executing the first command, produces a third result that is different from both the first result and the second result.

* * * * *